(12) United States Patent
Bourasseau et al.

(10) Patent No.: US 8,622,068 B2
(45) Date of Patent: Jan. 7, 2014

(54) MINIATURE GAS CABINET

(75) Inventors: Cyril Bourasseau, Grenoble (FR); Guillaume Rameau, Boulogne Billancourt (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 677 days.

(21) Appl. No.: 12/742,501

(22) PCT Filed: Nov. 19, 2008

(86) PCT No.: PCT/FR2008/052080
§ 371 (c)(1),
(2), (4) Date: May 12, 2010

(87) PCT Pub. No.: WO2009/071798
PCT Pub. Date: Jun. 11, 2009

(65) Prior Publication Data
US 2010/0258208 A1   Oct. 14, 2010

(30) Foreign Application Priority Data
Nov. 22, 2007   (FR) .................................... 07 59210

(51) Int. Cl.
*F17C 13/04*   (2006.01)
(52) U.S. Cl.
USPC .................. 137/15.04; 137/240; 137/613
(58) Field of Classification Search
USPC ................... 137/613, 240, 238, 15.01, 15.04
See application file for complete search history.

(56) References Cited

U.S. PATENT DOCUMENTS

| 4,887,645 A | 12/1989 | Kerger |
| 6,314,986 B1 * | 11/2001 | Zheng et al. ................... 137/240 |
| 7,798,168 B2 * | 9/2010 | Olander et al. ............. 137/487.5 |

FOREIGN PATENT DOCUMENTS

| DE | 87 03 198 | 4/1987 |
| DE | 198 18 306 | 10/1999 |
| EP | 0 655 578 | 5/1995 |
| EP | 0 916 891 | 5/1999 |
| EP | 1 037 269 | 9/2000 |
| EP | 1 180 638 | 2/2002 |
| EP | 1 316 755 | 6/2003 |
| LU | 86 802 | 8/1987 |

OTHER PUBLICATIONS

International Search Report for PCT/FR2008/052080, Jun. 11, 2009.

* cited by examiner

*Primary Examiner* — Kevin Lee
(74) *Attorney, Agent, or Firm* — Patricia E. McQueeney

(57) ABSTRACT

The invention relates to a device for the supply of special gas that can be mounted on a gas cylinder. The device comprises a multi-function unit housing a fluid circuit comprising a single high-pressure regulator; a purge system consisting of three low-pressure valves; a fluidic connection with the inner space of a cylinder; and an outlet enabling equipment to be supplied with gas. The invention is characterized in that the high-pressure regulator is arranged upstream of the purge system.

21 Claims, 1 Drawing Sheet

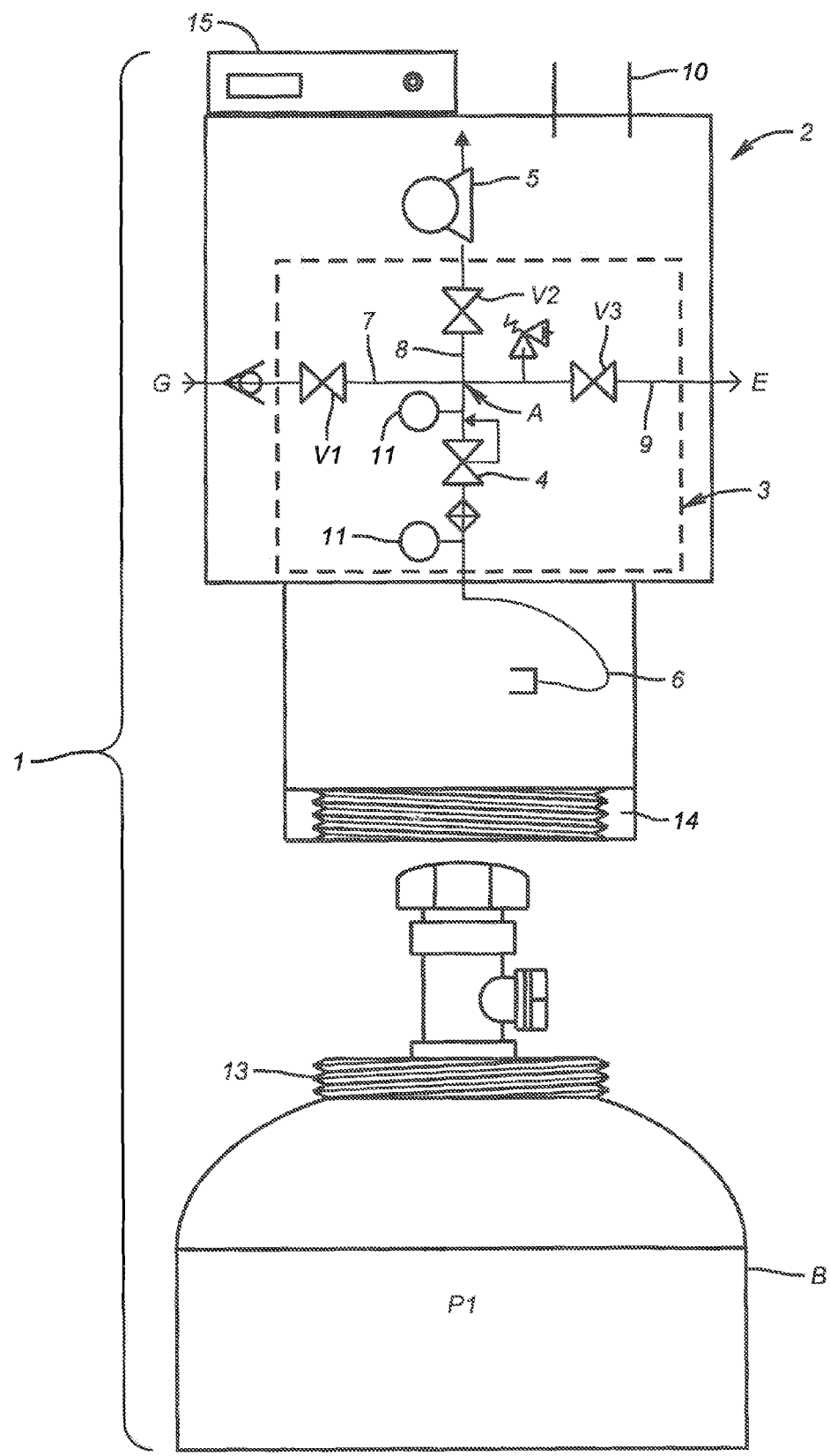

MINIATURE GAS CABINET

This application is a 371 of International PCT Application PCT/FR2008/052080, filed Nov. 19, 2008, which claims priority to French Application No. FR 0759210, filed Nov. 22, 2007, the entire contents of each being incorporated herein by reference.

The present invention relates to a device for distributing specialty gases (ESG) for use in specific and isolated applications that take place in the silicon industry and more specifically in the microelectronics, photovoltaic, optoelectronics or semiconductor industry. The device according to the invention may also be used by laboratories that employ gases, for example toxic or flammable gases, particularly laboratories connected with the silicon industry.

BACKGROUND

Many industrial installations demand equipment capable automatically of controlling the supply of gases and fluids to certain equipment. The manufacture of integrated circuits generally includes several processes such as, for example, vapor deposition, in which a variety of gases is conveyed to a reaction chamber in which a semiconductor substrate is confined. The temperature and pressure at which the various layers of materials developed in order to create three-dimensional models of integrated circuits are deposited are carefully controlled in this space.

All the substances carried into and out of the reaction chamber have to be constantly monitored because the proportions of the various reagents that make up the vapor atmosphere ultimately determine the physical dimensions of the elements which together will make up a simple vast electrical circuit on a minuscule piece of silicon, notably transistors, capacitors and resistors. One of the greatest causes of incorrect operation of integrated circuits can be attributed to microscopic dust particles contaminating the working area in which the circuit is manufactured. A minuscule foreign body can damage a very expensive circuit and render it unusable. To protect against such particulate contamination, the manufacturers of semiconductors manufacture their products in a protected "clean room" environment.

The air admitted to a clean room is first of all filtered, thus almost entirely eliminating the undesired dust particles. The technicians who work in these environments wear special masks and clothing that prevent the introduction of substances that would be damaging to their meticulous work. The costs associated with the maintenance and correct running of this highly specialized environment are considerable. Hence, any clean room space has to be used as efficiently as possible.

Aside from this critical requirement, the chemical products used have to be distributed with great care. The liquid chemical products and specialty gases used in the semiconductors industry are often toxic. The devices chosen for distributing these potentially dangerous products have to provide reliable use, protected against corrosion or leakage.

In a conventional gas distribution system, the large volumes of gas, potentially dangerous, to be purged creates safety problems. The sets of pipework and precision fits are also inclined to leak or to serious damage during use. These installations are therefore not well suited to isolated use requiring frequent disconnection and purge that increase the risks of the operator being exposed to dangerous gases.

Hitherto, the use of gas cabinet devices for distributing specialty gases has revealed that the safety, cost and control downtime are not optimized for isolated applications. These standard gas cabinets can especially be used routinely and reliably for long-term production and distribution applications. These systems are fully installed in large cabinets in dedicated rooms that may lie several tens of meters away from the equipment to which they are connected. When maintenance, calibration, testing or qualification of new sources of ESG for existing methods, evaluation of new methods involving the use of ESG on existing machines, or repair are required, the distribution line may need to be disconnected from a gas cabinet, and may need to remain so for a prolonged period.

As far as laboratories are concerned, because of the high cost of a standard gas cabinet, potentially dangerous gas is distributed sometimes even without a cabinet that has extraction, increasing the risks to the operator, particularly when connecting/disconnecting a cylinder.

There is no distribution device especially devoted to the specific applications mentioned hereinabove and comprising a system that allows it to be fitted to any cylinder without modifying the cylinder. Patent applications EP1316755, EP0916891 and EP1180638 disclose miniature gas distribution systems mounted in place of the standard valve with which a cylinder is equipped. This means that this type of system is specific to the cylinder to which it is fitted and cannot therefore be used on other cylinders. In this regard, it does not meet the requirements of flexibility, mobility, minimum space occupancy and low cost required by the applications at which the present invention is aimed.

The solution hitherto used for distributing specialty gases in laboratories or for the aforementioned applications, is the use of a standard gas cabinet. This gas cabinet may either already be in use for distributing gas to given equipment or procured specially for the purpose.

The use of a standard gas cabinet is ill suited to the specific applications mentioned hereinabove, and that may present risks notably due to the purges and potential disconnections. Specifically, a standard gas cabinet is particularly ill suited to this type of application because of its cost, the amount of space it occupies, its complexity and the constraints involved in bringing it into service, such as the couplings with the equipment. In the microelectronics industry, these kinds of tests can be carried out with the gas cabinet used in production and connected to the machine in which the tests are performed. However, the use of a standard gas cabinet, typically located in a specific room of the production facility, for example entails the purging of long lines of pipework before a new gas cylinder that is to be tested can be connected. In addition, in the microelectronics industry, a distribution device may potentially be used by several items of equipment. Making a distribution device available for isolated applications may entail the needless shutting down of equipment not affected by the tests.

Another solution may be to purchase a standard gas cabinet devoted to this type of test. This solution proves to be very expensive because of the cost of the distribution device and also because of the cost of coupling to the machine. In addition, a standard gas cabinet lives in a set location, and this means that either lines have to be run to all the equipment likely to undergo testing or that the number of these gas cabinets has to be increased. In both instances, the cost of the operation is prohibitively high.

And so, neither the procurement of a standard gas cabinet nor the use of an existing gas cabinet is a solution well suited to this type of application. Further, any equipment used in a clean room has to occupy a very minimal amount of space.

Developing a miniaturized specialty gas distribution device that can be used with any gas cylinder, that is safe, has intelligent automated control, can be used in the silicon industry and more particularly in the microelectronics, photovoltaic, optoelectronics or even semiconductor industry or that can be used in laboratories would constitute significant technological progress. Implementation of a device as innovative as this would meet a long-felt need in such industries.

SUMMARY

One object of the present invention is to alleviate all or some of the abovementioned disadvantages of the prior art.

The above list of applications is of course not exhaustive and the invention may also meet the needs of facilities such as laboratories for applications that do not require the entry into service of a conventional gas cabinet that is too expensive and more restrictive. Further, the device according to the invention can be used for the applications described hereinabove, directly in the clean room, as close as possible to the equipment that is to be tested.

To this end, a subject of the present invention is a device for distributing specialty gases able to be mounted on a gas cylinder (irrespective of what gas cylinder) without making modifications to the cylinder, comprising a multi-function unit housing a fluid circuit comprising:
a single high-pressure regulator,
a purge system consisting of three low-pressure valves,
a means of fluidic connection to the contents of a cylinder,
an outlet allowing equipment to be supplied with gas,
characterized in that the high-pressure regulator is situated upstream of the purge system. This entire gas distribution system is housed inside a space enveloping the main cylinder valve of the cylinder and that may be connected to an extraction system so as to protect the operator from any potential leaks of dangerous gas. The elements of the distribution device that are liable to leak and therefore to expose the operator to dangerous gases are placed inside a space with extraction so as to limit the risks of exposure. The volume of the space with extraction is very small, that is to say below 27 000 cm$^3$.

The extraction system is a device for distributing toxic, corrosive or flammable or even inert specialty gases.

An extraction system comprises a pump which creates a reduced pressure in a pipe connected to the device of the present invention at the extraction coupling situated on the part. It allows the air inside the miniature cabinet in which the cylinder and the distribution device (valves, pipework, sensors, etc.) are located to be renewed (because of the reduced pressure and suction of the pump).

This affords the advantage that the operator can be protected in the event of a leak from the system when gas is being distributed. Specifically, if the distribution system leaks, the gases are sucked up and conveyed to an appropriate treatment system. The extraction flow rate is calculated in such a way as to comply with the recommendations that ensure operator safety. In the event of a leak, the gases cannot therefore collect in the cabinet or leave the latter, either of which situations would present a danger to the operator.

What is meant by specialty gases are all the gases generally used in the semiconductor industry. These may be gases that are inert, toxic, corrosive or pyrophoric. These specialty gases may be chosen from: HF, WF6, BCl3, ClF3, DCS, 3MS, C4F6, C4F8O, C4F8, butane, SO2, Cl2, C3F8, NH3, propane, SF6, HBr, C2F6, CHF3, HCl, CHF3, N2O contained in a cylinder B in liquefied form, or from F2, PH3, B2H6, NO, NF3, SiH4, CF4, CH4, CO contained in the cylinder B in compressed form. Thus, depending on the nature of the gas that is to be distributed and whether it is liquefied or in a compressed state, the pressure inside the cylinder B ranges between 0 bar and 200 bar.

The invention is intended for specific isolated applications that may be non-continuous in time, other than the production applications, regarding gases that may be liquefied or even compressed. Essential features of the invention are therefore the mobile nature and miniature size of the device comprising the multi-function unit and the simplifying of the way in which the components of the device according to the invention are arranged by comparison with a standard installation such as a gas cabinet.

Moreover, some embodiments of the invention may include one or more of the following features:
the device described hereinabove may further comprise a vacuum generator. The vacuum generator is a venturi or a miniature electric pump. Furthermore, the device according to the invention may comprise an emergency breaker switch.
According to one subject of the invention, the device is characterized in that the purge system is a so-called cross-purge system comprising a first pipe known as the pressurizing pipe, a second, outlet, pipe allowing a vacuum to be created and a third, extraction, pipe allowing the gas that is to be distributed to be conveyed to equipment, the three pipes being connected at a point A situated downstream of the regulator.
According to one subject of the invention, the device is characterized in that the multi-function unit further comprises a pressure sensor upstream of the regulator.
According to one subject of the invention, the device is characterized in that the multi-function unit further comprises a pressure sensor downstream of the regulator and upstream of the purge system.
According to one subject of the invention, the device is characterized in that it comprises a coupling situated on one of its exterior walls and which can be connected to an extraction system.
According to one object of the invention, the device comprises an electrical control system for actuating the pneumatic valves and for managing the pressure sensors and the purge cycles.
According to one subject of the invention, the device comprises a collar provided with fastening elements such as a tapping designed to collaborate with complementary fastening elements of a main cylinder valve of a gas cylinder. This allows the distribution device to be attached to any cylinder.
According to one subject of the invention, the volume of said gas distribution device ranges between 1000 cm$^3$ and 27000 cm$^3$. By way of comparison, a standard gas cabinet hitherto used for the type of application explained hereinabove has a volume of the order of 600 000 to 700 000 cm$^3$.
The volume of the multi-function unit ranges between ¼ and ⅘, notably between ⅓ and ⅘ and preferably between ⅖ and ⅘ of the volume of said device that is the subject of the invention. More specifically, the volume of the multi-function unit is approximately equal to half the volume of said distribution device that forms the subject of the invention.
Another subject of the invention is an assembly for distributing specialty gases and consisting of a cylinder containing gas at a pressure P1 and of a device for distributing specialty gases as described hereinabove, characterized in that, in the vertical position of use, the footprint of said assembly is equal to the diameter of the cylinder. The pressure P1 of the gas in the cylinder ranges between 0 bar and 200 bar.

According to one particular aspect of the invention, the outlet pressure of the regulator is below 10 bar.

More specifically, when P1 is below 8 bar and when the equipment being supplied so permits, the multi-function unit has no high-pressure regulator.

Another subject of the invention is a method for qualifying a source of specialty gases, comprising:
a step of withdrawing gas from a cylinder,
a step of distributing the gas by means of a distribution device, as described hereinabove.

Another subject of the invention is the use of the device as described hereinabove to qualify a new source of specialty gases.

Another subject of the invention is the use of the device as described hereinabove for evaluating new methods that implement the use of specialty gases on existing machines.

Specifically, in the semiconductor industry, various types of machine may be used, notably so-called deposition machines, for example CVD machines or machines known as etching machines. These various machines operate on a certain gas chosen from among the ESGs. If a new gas comes into use with these machines, this gas will then have to undergo a qualification test.

This test is aimed at qualifying the compatibility of the new source of gas with the machine. For example, the purity of the new gas could fail to comply with the purity required, which would lead to major disadvantages in terms of the layers deposited. Further, these existing machines are developed during a predefined process and intended for one type of deposition. Nonetheless, it is common practice to wish to modify the type of deposition for a new application (using a different gas or different flow rates, for example), while at the same time using the same machines. With present-day devices, it is necessary to disconnect the gas cabinet and therefore temporarily shut down the production line in order to carry out compatibility tests for a potential new application. The device according to the invention used in this way makes it possible to avoid purchasing the new machine or shutting down the entire line, as this would entail exorbitant costs.

Another object of the invention is a multi-function unit housing a fluid circuit, said fluid coming from a cylinder and being intended to be delivered by a distribution device such as the device as described previously, comprising:
a single high-pressure regulator,
a purge system consisting of three low-pressure valves,
a means of fluidic connection to the contents of a cylinder,
characterized in that the high-pressure regulator is situated upstream of the purge system.

A filter may optionally be incorporated upstream and/or downstream of the regulator. This affords the regulator some protection and ensures the purity of the gas distributed, if applicable. This is another advantage over the use of a standard gas cabinet.

BRIEF DESCRIPTION OF THE DRAWINGS

Other particulars and advantages will become apparent from reading the description which follows, given with reference to the FIGURE.

The FIGURE depicts a simplified diagram of the device according to the invention.

DESCRIPTION OF PREFERRED EMBODIMENTS

The FIGURE depicts a specialty gas distribution assembly 1 consisting of a gas cylinder B and of a specialty gas distribution device that can be attached to the cylinder B.

The device 2 comprises a vacuum generator 5 and a multi-function unit 3 comprising a single high-pressure regulator 4, a purge system comprising three valves V1, V2 and V3, and a means 6 of connection to the contents of the cylinder B.

The regulator 4 is situated upstream of the purge system so that gas from the cylinder B at a pressure P1 reaches the regulator 4 at this pressure P1. On leaving the regulator 4, the gas flows at a pressure of the order of a few bar, that is to say at low pressure.

Accordingly, the valves V1, V2 and V3, and all the other components likely to be contained in a multi-function unit 3 experience gas at low pressure. This is a considerable advantage in terms of component reliability, safety and life. It also reduces the risks of leaks.

Furthermore, this feature allows components such as the actuators of diaphragm valves, the gas pipes and the seals, for example, to be miniaturized and allows their layout to be simplified, thus leading to a mini gas cabinet, that is to say to a device 2 or mini gas cabinet volume that is considerably reduced, for example ranging between 1000 $cm^3$ and 27 000 $cm^3$ notably by virtue of the miniaturizing of the multi-function unit 3 contained in this mini gas cabinet 2.

The purge system comprises a first pipe 7 on which the valve V1 is situated, intended to receive a purge gas G with which the circuit is pressurized, when the valve V1 is open. Said purge gas G may be chosen from nitrogen, argon and helium. For preference, nitrogen is used for purging. A second pipe 8 comprising the valve V2 is intended to connect the first pipe 7 to the vacuum generator 5, which may be a venturi or a miniature electric pump. The connection can also be left open to allow connection to an external vacuum system.

These first two pipes 7 and 8 are connected at a point A situated downstream of the regulator 4, to the pipe 9 containing the valve V3 intended to supply the equipment E when the valve V3 is open.

Conventional purge systems generally also comprise a so-called shut-off valve upstream of the regulator. The shut-off valve is in theory needed in the event of leaks or alerts due to a possible danger of an accident following malfunction of the system. Specifically, the function of this valve is to shut off the distribution system in such situations. This is not required here because the volume of the unit 3 is so small that the risk of a leak between the cylinder B and the regulator 4 is considerably reduced. Further, this valve becomes needless because the applications of the system according to the invention are highly isolated, which means that there will always be an operator nearby the device, capable himself of stopping the application in the event of an alert. In the case of a cylinder comprising a pneumatic valve, this valve can also be controlled by the device according to the invention. The device according to the invention therefore does not contain any sensitive elements in contact with a gas at high pressure.

The distribution device 2 that forms the subject of the present invention may also comprise a vent 10 allowing gas to be extracted in the event of a leak; the specialty gases used in the semiconductor industry are dangerous and this is why the standard specialty gas distribution devices are enclosed in a cabinet known as a gas cabinet. Here, the miniaturizing of the device allows the components present in a limited number, and arranged in a simplified manner to be enclosed in a small-volume multi-function unit 3 affording the protection required.

The distribution device 2 may also comprise in its multi-function unit 3 pressure sensors 11, for example positioned upstream and/or downstream of the regulator.

The invention may also be made up of an innovative mechanism, not depicted here, for attaching the distribution device 2 to a screw thread 13 of the cylinder B via a collar 14, the latter being screwed onto the screw thread of the cylinder B.

This fastening system therefore allows the distribution device 2 according to the invention to be fitted to any conventional gas cylinder, thus affording an unprecedented advantage for the applications at which the present invention is aimed.

The distribution device 2 is controlled by an electrical system 15 that allows control of the pneumatic valves V1, V2 and V3 and allows the purge sequence to be automated.

This electrical system 15 comprises, for example, an electrical power supply, electrically operated valves that serve to actuate pneumatic valves, a logic controller, an emergency stop button, a screen, for example an LCD screen, to display the system status.

The control mechanism consists for example of a programmable logic controller. Such a logic controller can be chosen from those already existing commercially. Thus, the system according to the invention is able, in addition to affording the abovementioned advantages, to be paired with commercially available control mechanisms. For preference, the control mechanism chosen is the simplest and least expensive possible; because the miniaturizing of the system according to the invention is connected with a vast simplification of the elements of which it is composed and with a simplification of how they are arranged, use of a simplified control mechanism is readily conceivable, unlike standard gas cabinets, which are generally highly complex.

The considerably reduced volume of the unit reduces the amount of working gas in the device at any moment, as compared with the amounts of gas held in conventional gas cabinets, associated with their far longer distribution lines. This reduction in overall volume allows the device a minimal discharge time and far better results in a management system that is also far more dependable. The present invention guarantees safe and rapid handling of toxic, corrosive, flammable and pyrophoric gases.

The present invention makes it possible to reduce the number of particulate traps in the multi-function unit 3. The invention implements a device having means of installation, of troubleshooting and of modification which are quick and easy. Indeed this lightweight unit is simple to transport and to handle.

The invention described has a simplified structure well suited to the target applications, making it possible to minimize the cost of the product and the space occupied thereby. The main component of the mini gas cabinet that is the subject of the present invention, that is to say the unit 3 incorporating the regulator 4 and the 3 valves V1, V2 and V3 developed specifically for this application is a novel feature that allows an appreciable space and volume saving.

Because of its mobility the invention additionally allows the gas and its distribution device to be brought up as close as possible to the equipment during isolated tests such as the qualification of sources or the evaluation of processes. The ensuing advantages are, for example, the reduced cost of coupling to the equipment, a reduced length of line making purging in particular easier, mobility that allows the distribution system to be moved around to various equipments.

The multi-functionality and mobility of the system allow it to be used and fitted on a wide variety of cylinders of any volume and on different equipments.

Another feature of the distribution device that forms the subject of the present invention is that it is a miniature gas cabinet made up of the main functions of a standard gas cabinet. The structure has been specially designed to minimize cost, space occupation and the number of components while at the same time keeping only the functionalities required.

All the components used meet semiconductor industry standards.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A device for distributing specialty gases able to be mounted on a gas cylinder comprising
a single multi-function unit housing a fluid circuit comprising:
a single high-pressure regulator;
a purge system situated downstream of the regulator comprising three low-pressure valves;
a fluidic connection to the contents of a cylinder; and
an outlet allowing equipment to be supplied with gas,
the device being incorporated into a space that allows an extraction zone to be created around a main cylinder valve of the gas cylinder.

2. The device of claim 1, further comprising a vacuum generator.

3. The device of claim 1, wherein the purge system is a cross-purge system comprising a first pressurizing pipe, a second outlet pipe allowing a vacuum to be created, and a third extraction pipe allowing the gas that is to be distributed to be conveyed to equipment, the three pipes being connected at a point situated downstream of the regulator.

4. The device of claim 1, wherein the single multi-function unit further comprises a pressure sensor upstream of the regulator.

5. The device of claim 4, further comprising an electrical control system for actuating the valves and for managing the pressure sensor.

6. The device of claim 1, wherein the single multi-function unit further comprises a pressure sensor downstream of the regulator and upstream of the purge system.

7. The device of claim 1, further comprising a coupling situated on an exterior wall of the device, the coupling capable of being connected to an extraction system.

8. The device of claim 1, further comprising an electrical control system for actuating the valves.

9. The device of claim 1, further comprising a collar provided with fastening elements designed to collaborate with complementary fastening elements of the main cylinder valve of the gas cylinder.

10. The device of claim 1, wherein a volume of the device ranges between 1000 $cm^3$ and 27 000 $cm^3$.

11. The device of claim 1, wherein a volume of the single multi-function unit ranges between $\frac{1}{4}$ and $\frac{4}{5}$ of the volume of the device.

12. The device of claim 1, further comprising a cylinder containing gas at a pressure P1 and having the device mounted thereon, wherein, in a vertical position of use, a footprint of the device is equal to a diameter of the cylinder.

13. The device of claim 1, wherein the purge system of the single multi-function unit does not comprise a shut-off valve upstream of the single high-pressure regulator.

14. A device for distributing specialty gases able to be mounted on a gas cylinder comprising
a single multi-function unit housing a fluid circuit comprising:
   a single high-pressure regulator;
   a cross-purge system situated downstream of the regulator, the cross-purge system comprising three low-pressure valves, a first pressurizing pipe, a second outlet pipe allowing a vacuum to be created, and a third extraction pipe allowing the gas that is to be distributed to be conveyed to equipment, the three pipes being connected at a point situated downstream of the regulator;
   a fluidic connection to the contents of a cylinder;
   an outlet allowing equipment to be supplied with gas;
   a pressure sensor upstream of the regulator; and
   a pressure sensor downstream of the regulator and upstream of the purge system,
a space that allows an extraction zone to be created around a main cylinder valve of the gas cylinder;
a vacuum generator;
an electrical control system for actuating the valves and for managing the pressure sensor;
a coupling situated on an exterior wall of the device, the coupling capable of being connected to an extraction system; and
a collar provided with fastening elements designed to collaborate with complementary fastening elements of the main cylinder valve of the gas cylinder, wherein a volume of the device ranges between 1000 cm$^3$ and 27 000 cm$^3$ and a volume of the single multi-function unit ranges between ¼ and ⅘ of the volume of the device.

15. The device of claim 14, wherein the volume of the single multi-function unit ranges between ⅓ and ⅘ of the volume of said device.

16. The device of claim 14, further comprising a cylinder containing gas at a pressure P1 and having the device mounted thereon, wherein, in a vertical position of use, a footprint of the device is equal to a diameter of the cylinder.

17. The device of claim 14, wherein the cross-purge system of the single multi-function unit does not comprise a shut-off valve upstream of the single high-pressure regulator.

18. A method for distributing a specialty gas, comprising:
a step of withdrawing the specialty gas from a cylinder; and
a step of distributing the specialty gas by means of a distribution device mounted on the cylinder, the distribution device comprising
   a single multi-function unit housing a fluid circuit comprising:
      a single high-pressure regulator;
      a purge system situated downstream of the regulator comprising three low-pressure valves;
      a fluidic connection to the contents of the cylinder; and
      an outlet allowing equipment to be supplied with gas,
   the device being incorporated into a space that allows an extraction zone to be created around a main cylinder valve of the cylinder.

19. The method of claim 18, wherein:
the purge system is a cross-purge system comprising three low-pressure valves, a first pressurizing pipe, a second outlet pipe allowing a vacuum to be created, and a third extraction pipe allowing the gas that is to be distributed to be conveyed to equipment, the three pipes being connected at a point situated downstream of the regulator;
the single multi-function unit further comprises:
   a pressure sensor upstream of the regulator; and
   a pressure sensor downstream of the regulator and upstream of the purge system,
the distribution device further comprises:
   a vacuum generator;
   an electrical control system for actuating the valves and for managing the pressure sensor;
   a coupling situated on an exterior wall of the device, the coupling capable of being connected to an extraction system; and
   a collar provided with fastening elements designed to collaborate with complementary fastening elements of a main cylinder valve of the cylinder, and
wherein a volume of the device ranges between 1000 cm$^3$ and 27 000 cm$^3$ and a volume of the single multi-function unit ranges between ¼ and ⅘ of the volume of the device.

20. The method of claim 18, further comprising qualifying the specialty gas as a new source.

21. The method of claim 18, further comprising evaluating the specialty gas in a new method implemented on existing machines.

* * * * *